US012290228B2

(12) United States Patent
Ohm et al.

(10) Patent No.: US 12,290,228 B2
(45) Date of Patent: May 6, 2025

(54) MOBILE CLEANING ROBOT SUSPENSION

(71) Applicant: iRobot Corporation, Bedford, MA (US)

(72) Inventors: Timothy R. Ohm, Grover Beach, CA (US); Erik Amaral, Bolton, MA (US)

(73) Assignee: iRobot Corporation, Bedford, MA (US)

( * ) Notice: Subject to any disclaimer, the term of this patent is extended or adjusted under 35 U.S.C. 154(b) by 659 days.

(21) Appl. No.: 17/682,021

(22) Filed: Feb. 28, 2022

(65) Prior Publication Data
US 2023/0270299 A1  Aug. 31, 2023

(51) Int. Cl.
*A47L 9/00* (2006.01)
*B60G 3/00* (2006.01)
*B60G 17/00* (2006.01)

(52) U.S. Cl.
CPC ............... *A47L 9/009* (2013.01); *B60G 3/00* (2013.01); *B60G 17/00* (2013.01); *A47L 2201/04* (2013.01); *B60G 2500/30* (2013.01)

(58) Field of Classification Search
CPC ........ A47L 9/00; A47L 9/009; A47L 2201/00; A47L 2201/04; B60G 3/00; B60G 3/02; B60G 5/00; B60G 5/02; B60G 17/00; B60G 2500/30
USPC .................................................. 280/124.164
See application file for complete search history.

(56) References Cited

U.S. PATENT DOCUMENTS 4,706,327 A * 11/1987 Getz ..................... A47L 9/0411
15/354
2003/0165602 A1* 9/2003 Garwood ................. A23B 4/16
426/392
2016/0007817 A1* 1/2016 Schlischka .......... A47L 11/4061
280/5.514

(Continued)

FOREIGN PATENT DOCUMENTS

CN         1253308 A  *  5/2000  ............. G03B 19/04
CN       114454681 A  *  5/2022  ............. A47L 11/24

(Continued)

OTHER PUBLICATIONS

"International Application Serial No. PCT US2023 013930, International Preliminary Report on Patentability mailed Sep. 12, 2024", 7 pgs.

(Continued)

*Primary Examiner* — Jason D Shanske
*Assistant Examiner* — Daniel M. Keck
(74) *Attorney, Agent, or Firm* — Schwegman Lundberg & Woessner, P.A.

(57) ABSTRACT

A mobile cleaning robot can be movable within an environment, the mobile cleaning robot can include a body, a drive wheel arm, a drive wheel, a cam, and a cam follower. The drive wheel arm can be connected to the body and can be movable with respect to the body between an extended position and a retracted position. The drive wheel can be connected to the drive wheel arm and can be movable therewith. The drive wheel can be operable to move the mobile cleaning robot. The cam can be connected to the drive wheel arm and can be movable therewith. The cam follower can be connected to the body and can be engaged with the cam to move the drive wheel arm toward the extended position.

22 Claims, 10 Drawing Sheets

(56) References Cited

U.S. PATENT DOCUMENTS

| | | | |
|---|---|---|---|
| 2016/0166127 A1* | 6/2016 | Lewis | A47L 9/0472 |
| | | | 15/49.1 |
| 2020/0039307 A1* | 2/2020 | Wu | A47L 11/4072 |
| 2020/0205634 A1 | 7/2020 | Sutter et al. | |
| 2020/0275811 A1* | 9/2020 | Yato | A47L 9/2805 |
| 2020/0337513 A1* | 10/2020 | Johnson | A47L 11/4041 |
| 2023/0417617 A1* | 12/2023 | Chalofsky | G01M 1/045 |

FOREIGN PATENT DOCUMENTS

| | | |
|---|---|---|
| GB | 2494443 | 3/2013 |
| KR | 20120099122 A * | 9/2012 |
| WO | WO-2024102483 A1 * | 5/2024 |

OTHER PUBLICATIONS

"International Application Serial No. PCT US2023 013930, International Search Report mailed Jun. 21, 2023", 4 pgs.

"International Application Serial No. PCT US2023 013930, Written Opinion mailed Jun. 21, 2023", 5 pgs.

* cited by examiner

MOBILE CLEANING ROBOT SUSPENSION

BACKGROUND

Mobile robots include mobile cleaning robots that can perform cleaning tasks within an environment, such as a home. A mobile cleaning robot can navigate across a floor surface and avoid obstacles while vacuuming the floor surface and operating rotatable members carried by the robot to ingest debris from the floor surface. As the robot moves across the floor surface, the robot can rotate the rotatable members, which can engage the debris and guide the debris toward a vacuum airflow generated by the robot. The rotatable members and the vacuum airflow can thereby cooperate to allow the robot to ingest debris.

SUMMARY

Mobile cleaning robots can autonomously navigate through environments to perform cleaning operations, often traversing over, and navigating around, obstacles. Mobile cleaning robots include suspension systems to provide sufficient wheel downforce to overcome obstacles and to provide effective cleaning on various surfaces. Because obstacles can vary in shape and size and because floor types can also vary, a required wheel downforce can vary during operation of the robot. Many robots include suspension systems using an extension or compression spring directly connected to wheel arms, which can effectively deliver downforce; however, the delivered downforce can decay as the drive wheel extends from the body, delivering a less-than-desirable downforce profile.

This disclosure describes devices and methods that can help to address this problem such as by including a suspension system including a cam and a cam follower. The cam and cam follower can be connected to a biasing element and can indirectly transfer force to the wheel to provide downforce. Because the cam can be designed in a variety of shapes, the suspension system can be tailored to provide a desired wheel downforce over a range of extension of the wheel from the body of the robot, helping to improve object traversal and cleaning efficiency of the mobile cleaning robot and also helping to reduce costs between robot model variations.

For example, a mobile cleaning robot can include a body, a drive wheel arm, a drive wheel, a cam, and a cam follower. The drive wheel arm can be connected to the body and can be movable with respect to the body between an extended position and a retracted position. The drive wheel can be connected to the drive wheel arm and can be movable therewith. The drive wheel can be operable to move the mobile cleaning robot. The cam can be connected to the drive wheel arm and can be movable therewith. The cam follower can be connected to the body and can be engaged with the cam to move the drive wheel arm toward the extended position.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Robot Overview

Figure 1:
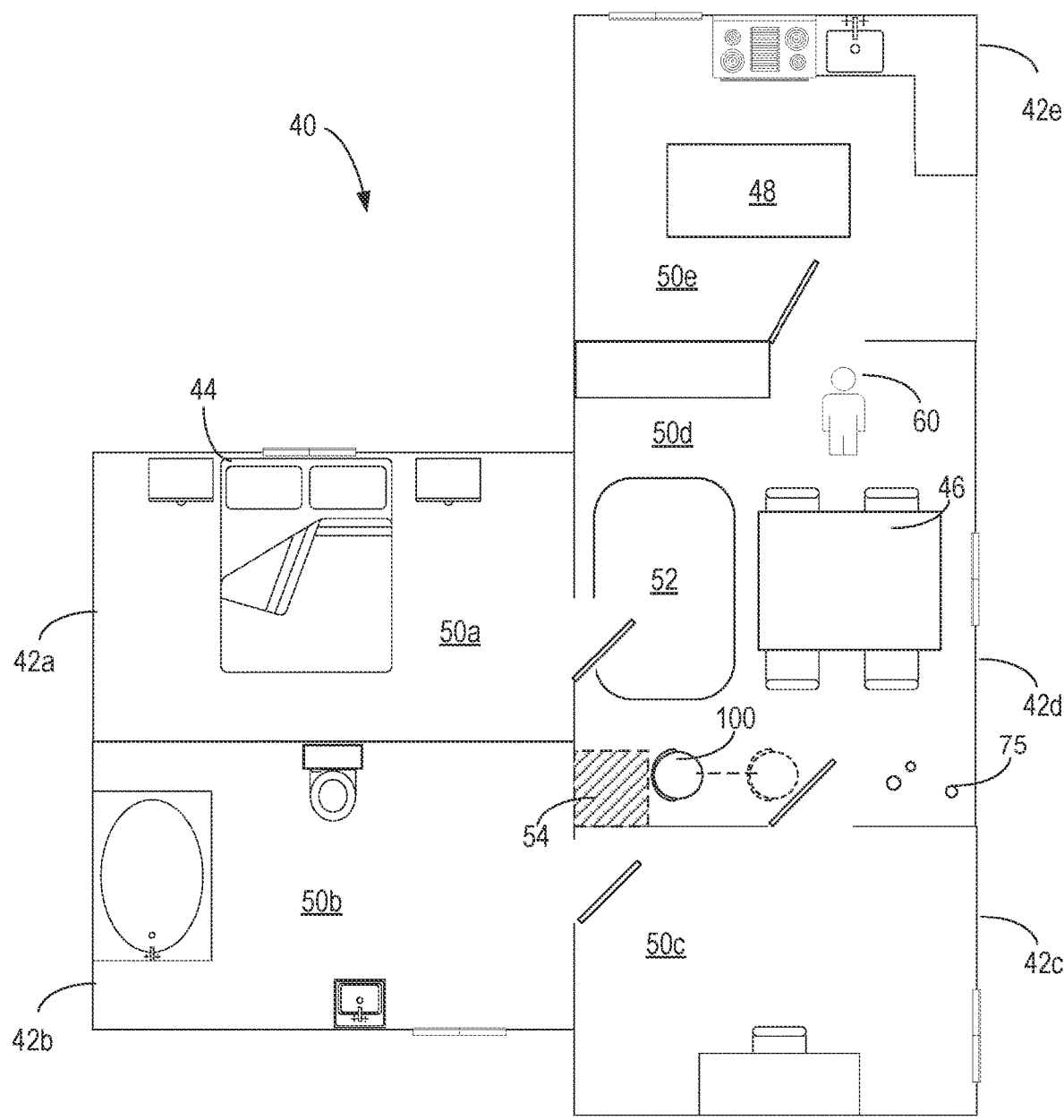
FIG. 1 illustrates a plan view of a mobile cleaning robot in an environment.

FIG. 1 illustrates a plan view of a mobile cleaning robot 100 in an environment 40. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d. The robot 100 can be configured to navigate over various floor types through one or more components such as a suspension. The suspension of the robot can also allow the robot 100 to navigate over obstacles, such as thresholds between rooms or over rugs, such as the rug 52.

Also during cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

Components of the Robot

Figure 2A:
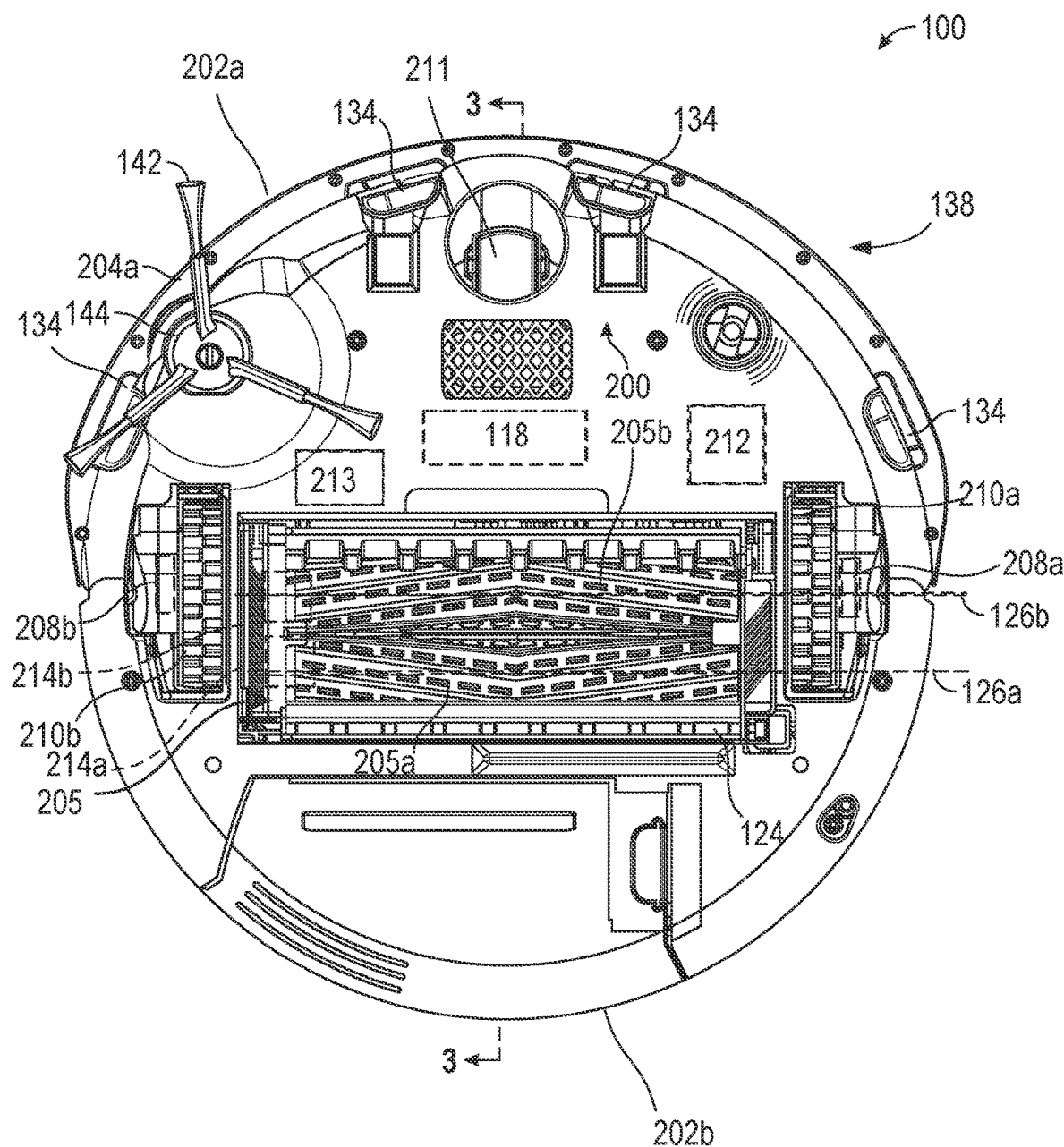
FIG. 2A illustrates a bottom view of a mobile cleaning robot.
Figure 2B:
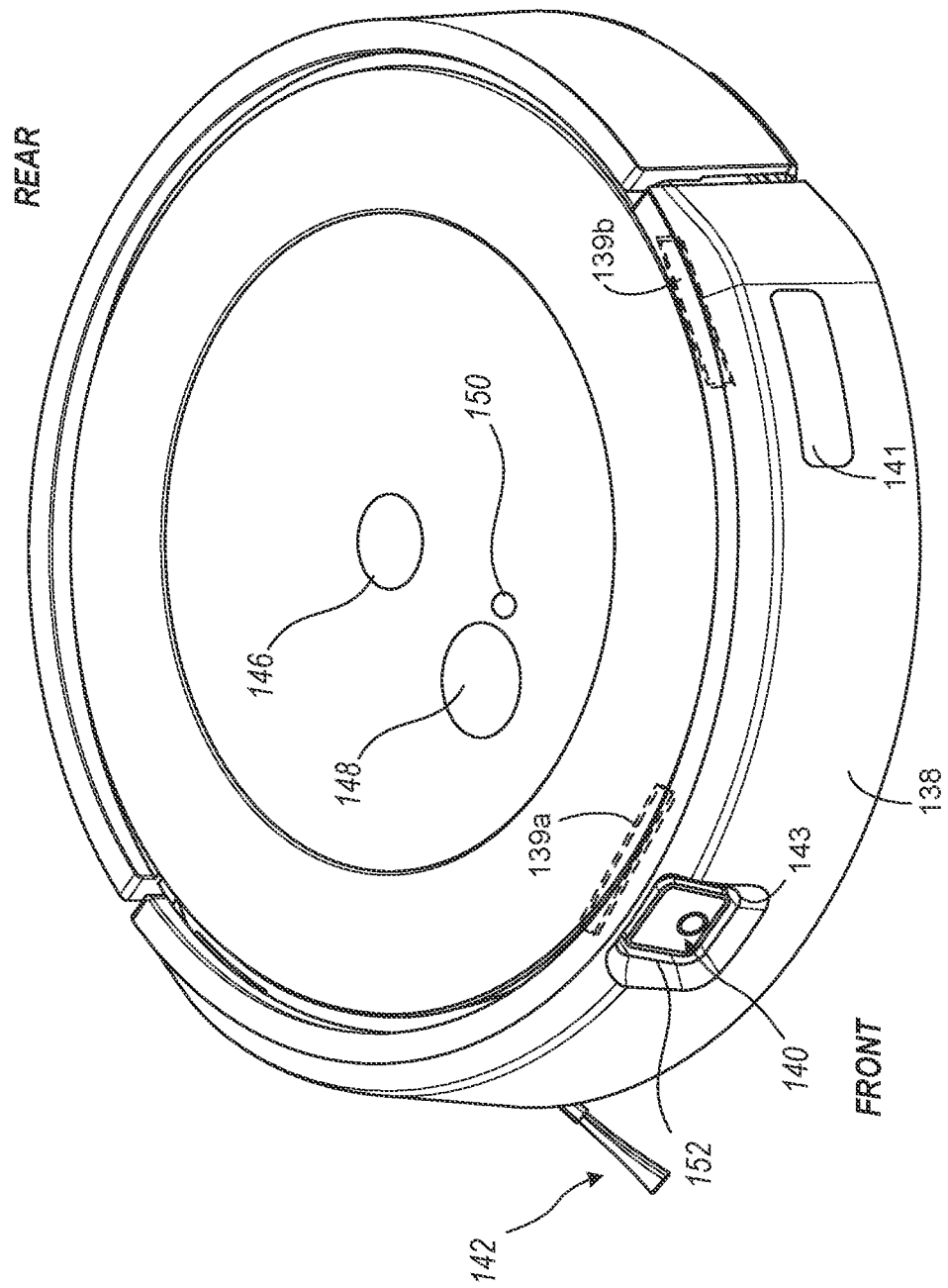
FIG. 2B illustrates an isometric view of a mobile cleaning robot.
Figure 3:
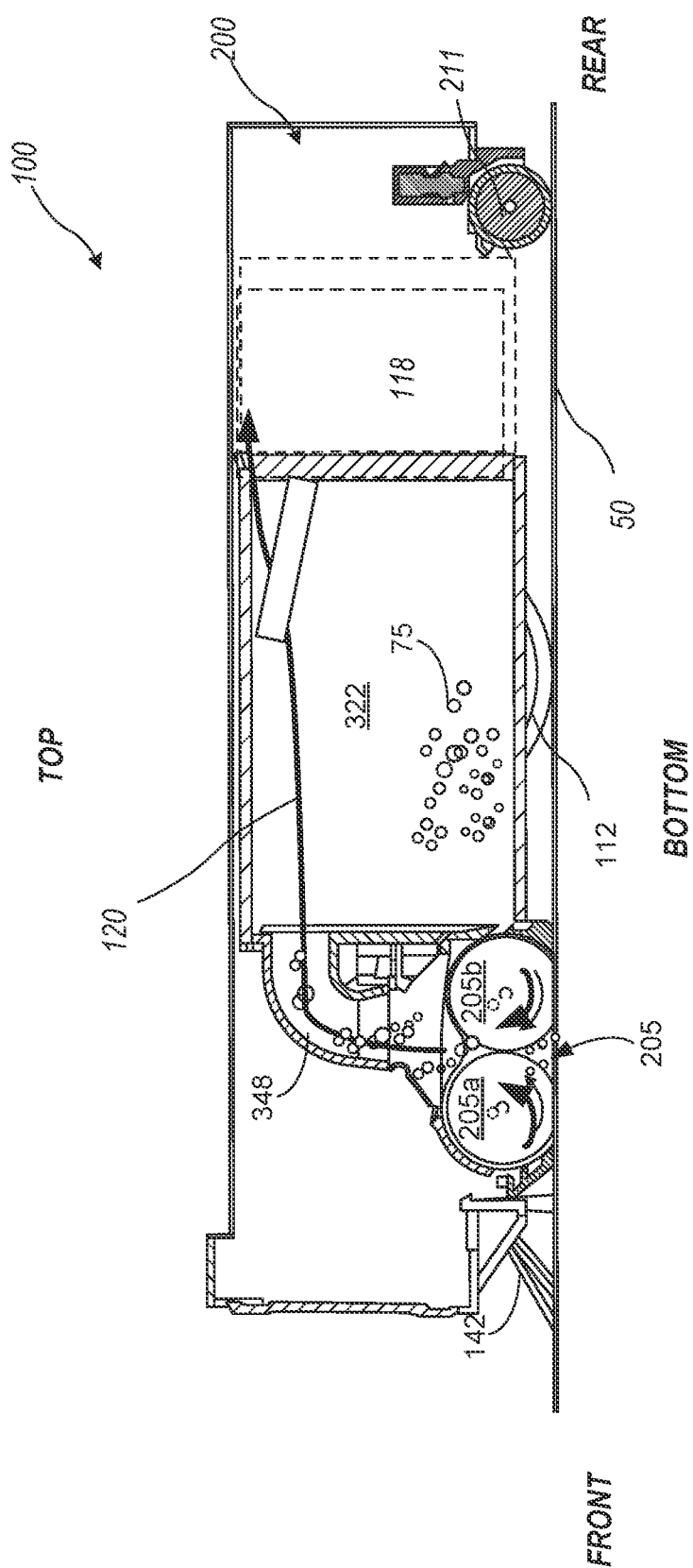
FIG. 3 illustrates a cross-section view across indicators 3-3 of FIG. 2A of a mobile cleaning robot.

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2A of the mobile cleaning robot 100. FIG. 3 also shows orientation indicators Bottom, Top, Front, and Rear. FIGS. 2A-3 are discussed together below.

The cleaning robot 100 can be a mobile cleaning robot that can autonomously traverse the floor surface 50 while ingesting the debris 75 from different parts of the floor surface 50. As depicted in FIGS. 2A and 3, the robot 100 can include a body 200 movable across the floor surface 50. The body 200 can include multiple connected structures to which movable components of the cleaning robot 100 can be mounted. The connected structures can include an outer housing to cover internal components of the cleaning robot 100, a chassis to which drive wheels 210a and 210b and the cleaning rollers 205a and 205b (of a cleaning assembly 205) are mounted, and a bumper 138 mounted to the outer housing.

As shown in FIG. 2A, the body 200 can include a front portion 202a that has a substantially semicircular shape and a rear portion 202b that has a substantially semicircular shape. As shown in FIG. 2A, the robot 100 can include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b can support the body 200 above the floor surface 50. The actuators 208a and 208b, when driven, can rotate the drive wheels 210a and 210b to enable the robot 100 to move across the floor surface 50.

The controller (or processor) 212 can be located within the housing 200 and can be a programable controller, such as a single or multi-board computer, a direct digital controller (DDC), a programable logic controller (PLC), or the like. In other examples the controller 212 can be any computing device, such as a handheld computer, for example, a smart phone, a tablet, a laptop, a desktop computer, or any other computing device including a processor and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the housing 200 and can be connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction, in a backwards direction, and to turn the robot 100. The robot 100 can include a caster wheel 211 (or alternatively skids) that supports the body 200 above the floor surface 50. The caster 211 can support the front portion 202b of the body 200 above the floor surface 50, and the drive wheels 210a and 210b support a middle and rear portion 202a of the body 200 above the floor surface 50.

As shown in FIG. 3, a vacuum assembly 118 can be located within the body 200 of the robot 100, e.g., in the middle of the body 200. The controller 212 can operate the vacuum assembly 118 to generate an airflow that flows through the air gap near the cleaning rollers 205, through the body 200, and out of the body 200. The vacuum assembly 118 can include, for example, an impeller that generates the airflow when rotated. The airflow and the cleaning rollers 205, when rotated, cooperate to ingest debris 75 into the robot 100. A cleaning bin 322 can be mounted in the body 200 to contain the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

The cleaning rollers 205a and 205b can operably connected to actuators 214a and 214b, e.g., motors, respectively. The cleaning head 205 and the cleaning rollers 205a and 205b can positioned forward of the cleaning bin 322. The cleaning rollers 205a and 205b can be mounted to a housing 124 of the cleaning head 205 and mounted, e.g., indirectly or directly, to the body 200 of the robot 100. For example, the cleaning rollers 205a and 205b can be mounted to an underside of the body 200 so that the cleaning rollers 205a and 205b engage debris 75 on the floor surface 50 during the cleaning operation when the underside faces the floor surface 50.

The housing 124 of the cleaning head 205 can be mounted to the body 200 of the robot 100. In this way, the cleaning rollers 205a and 205b can also mounted to the body 200 of the robot 100, e.g., indirectly mounted to the body 200 through the housing 124. The cleaning head 205 can also be a removable assembly of the robot 100 where the housing 124 with the cleaning rollers 205a and 205b mounted therein is removably mounted to the body 200 of the robot 100. The housing 124 and the cleaning rollers 205a and 205b can be removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the housing 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bump sensors 139a and 139b (the bump sensors 139) can be connected to the body 200 and engageable or configured to interact with the bumper 138. The bump sensors 139 can include break beam sensors, capacitive sensors, switches, or other sensors that can detect contact between the robot 100, i.e., the bumper 138, and objects in the environment 40. The bump sensors 139 can be in communication with the controller 212.

An image capture device 140 can be a camera connected to the body 200 and can extend through the bumper 138 of the robot 100, such as through an opening 143 of the bumper 138. The image capture device 140 can be a camera, such as a front-facing camera, configured to generate a signal based on imagery of the environment 40 of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment 40. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138. Optionally, the robot 100 can include multiple side brushes, such as one located on each side of the body 200, such as in line with drive wheels 210a and 210b, respectively.

The robot 100 can also include a button 146 (or interface) that can be a user-operable interface configured to provide commands to the robot, such as to pause a mission, power on, power off, or return to a docking station. The robot 100 can also include a privacy button 148 (or interface) that can be a user-operable interface configured to provide commands to the robot, such as to disable or restrict use of the camera 140. For example, pressing the privacy button 148 can cut power to the camera 140 or can operate a shutter 152 to close or open. An indicator 150 can optionally be included and can be lit to indicate when the camera 140 is operating. Additional privacy controls and options are discussed in further detail below with respect to FIGS. 4A-6.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 144 to cause the brush 142 to rotate, and can operate the motor of the vacuum system 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment 40. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bump sensor 139a can be used to detect movement of the bumper 138 along a fore-aft axis of the robot 100. A bump sensor 139b can also be used to detect movement of the bumper 138 along one or more sides of the robot 100. The bump sensors 139 can transmit signals to the controller 212 so that the controller 212 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bump sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment 40 and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment 40.

Suspension Examples

Figure 4A:
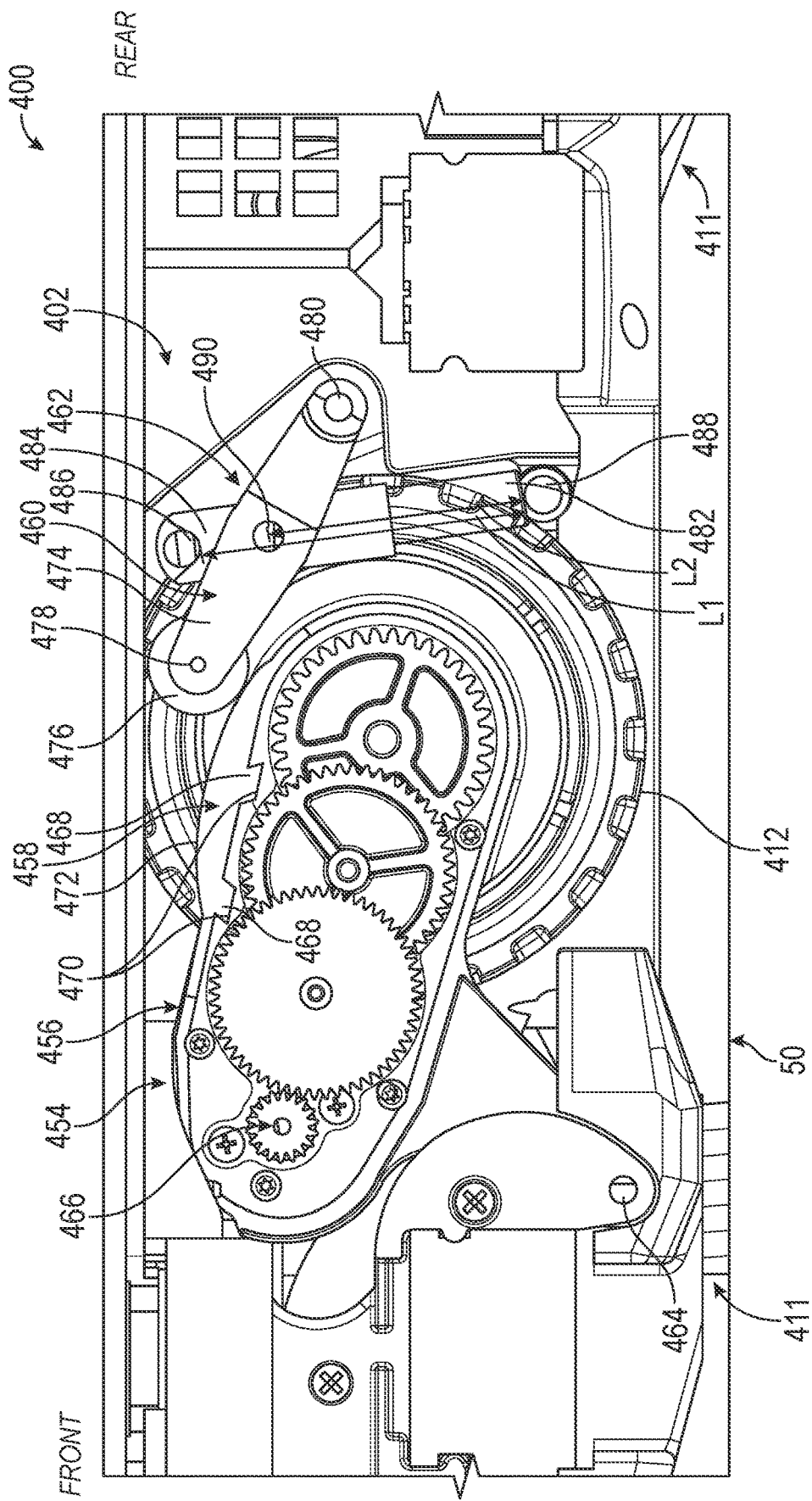
FIG. 4A illustrates a cross-section view of a portion of a mobile cleaning robot in a first condition.
Figure 4B:
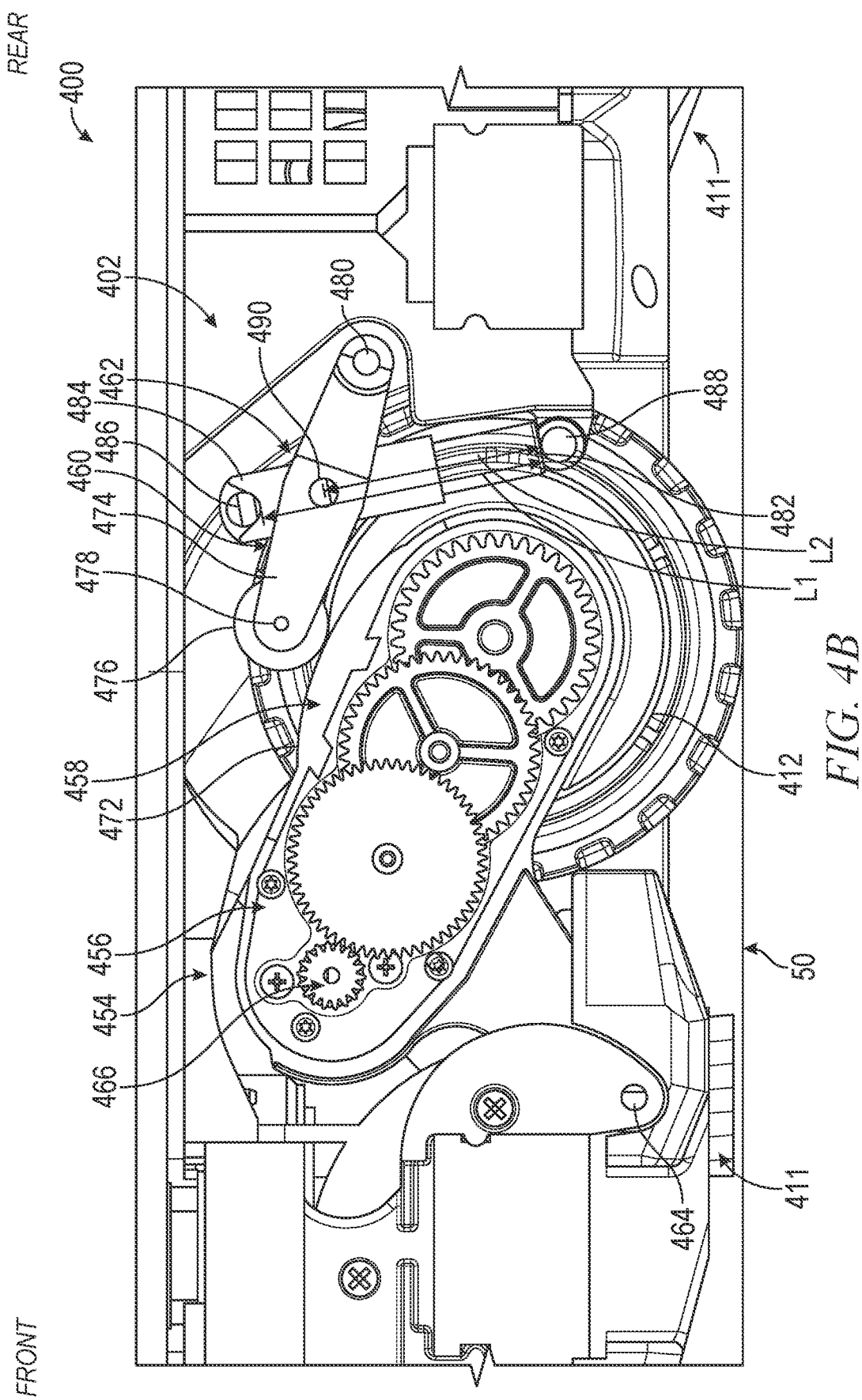
FIG. 4B illustrates a cross-section view of a portion of a mobile cleaning robot in a second condition.
Figure 4C:
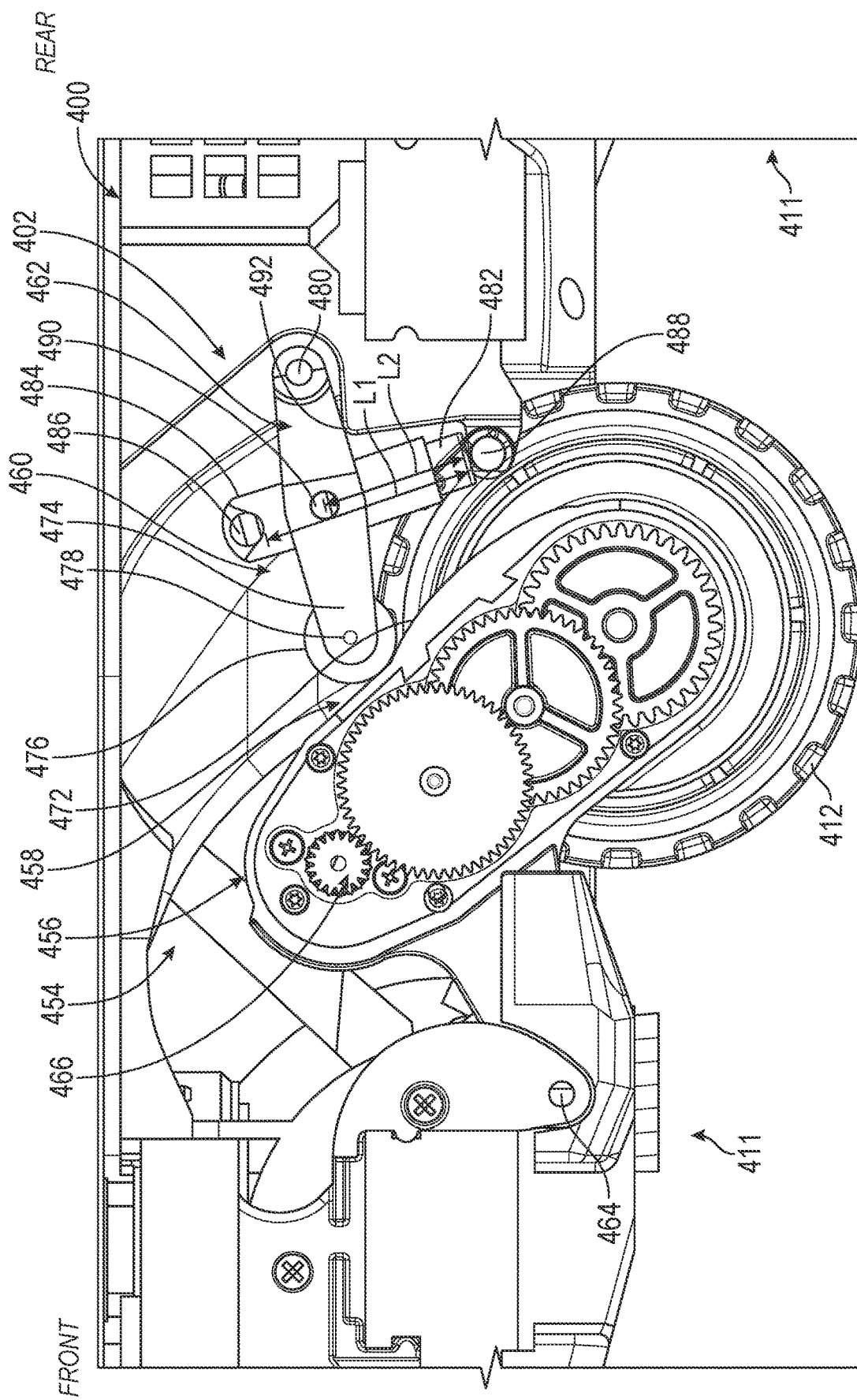
FIG. 4C illustrates a cross-section view of a portion of a mobile cleaning robot in a third condition.

FIG. 4A illustrates a cross-section view of a portion of a mobile cleaning robot 400 in a first condition. FIG. 4B illustrates a cross-section view of a portion of the mobile cleaning robot 400 in a second condition. FIG. 4C illustrates a cross-section view of a portion of the mobile cleaning robot 400 in a third condition. FIGS. 4A-4C are discussed together below. The mobile cleaning robot 400 can be similar to the robot 100 discussed above. FIGS. 4A-4C show that the mobile cleaning robot 400 can include a cam-based suspension system. Any of the robots discussed above or below can be modified to include such a suspension.

More specifically, the mobile cleaning robot 400 can include a body 402 supported by drive wheels 412 (only one wheel is visible in FIGS. 4A-4C) and skids 411. Optionally, the skids 411 can be substituted with a caster. The mobile cleaning robot 400 can also include a suspension system 454 connected to the body 402 and connected to the drive wheels 412. The suspension system 454 can be configured to control or determine a downforce applied by the wheels 412.

The suspension system 454 can include a drive wheel arm 456, a cam 458, a cam follower assembly 460, and a spring assembly 462 (or biasing assembly). The drive wheel arm 456 can be connected to the body 402 and movable with respect to the body 402 between an extended position (as shown in FIG. 4C) and a retracted position (as shown in FIG. 4A). The drive wheel arm 456 can be connected to the body 402 at a pivot 464, which can allow the drive wheel arm 456 and the drive wheels 412 to pivot with respect to the body 402. The drive wheel arm 456 can support a drive train 466 connected to the drive wheel 412 and configured to drive the drive wheel 412 to rotate.

The cam 458 can be connected to the drive wheel arm 456 and can be movable therewith. The cam 458 can optionally include projections 468 insertable into slots 470 (numbered in FIG. 4A) of the drive wheel arm 456, such as in a dovetail configuration. This configuration can allow the cam 458 to be easily replaceable to achieve a different cam profile, as discussed in further detail below. The cam 458 can define a cam surface 472 that can be contoured for engagement with the cam follower assembly 460 to move the drive wheel arm 456 toward the extended position while achieving a desired downforce profile of the drive wheel 412 through such a range of movement.

The cam follower assembly 460 can include a cam arm 474, a cam follower 476, and a pin 478. The cam arm 474 can be a rigid or semi-rigid member that can be connected to the cam follower 476 via the pin 478 such as to support rolling motion of the cam follower 476 with respect to the cam arm 474. Rolling motion of the cam follower 476 cab allow the cam follower 476 to rotatably follow the cam surface 472. The cam arm 474 can be connected to the body 402 via a pivot 480 such as to allow the cam follower assembly 460 to pivot with respect to the body 402.

The pin 478 can be a solid pin configured to act as a journal bearing for the cam follower 476 (optionally the pin 478 can be rolled or hollow). The pin 478 can be other bearings in other examples, such as a ball bearing system. The pin 478 can have an outer diameter between 0.5 millimeters (mm) and 10 mm and can be, for example between 1 mm and 3 mm. The pin 478 can be made of one or more of metal, polymer, ceramic, or the like. For example the pin 478 can be a polished steel pin. The pin 478 can optionally be coated to reduce friction between the cam follower 476, the pin 478, and the cam arm 474. The pin 478 can be supported by bores in the cam arm 474 and can be secured thereto, such as in a press fit arrangement, to form a rolling interface or engagement between the pin 478 and the cam follower 476. Optionally, the pin 478 can be secured to the cam follower 476 to form a rolling interface or engagement between the pin 478 and the cam arm 474. Optionally, the pin 478 can be secured in various other manners such that the pin 478 can rotate with respect to the cam arm 474 and such that the cam follower 476 can rotate with respect to the pin 478.

Optionally, the pin 478, the bores of the cam arm 474, or the cam follower 476 can be coated to reduce friction between the components, such as with polytetrafluoroethylene (PTFE) or the like. Similarly, the cam surface 472 can optionally be coated with or made of a low-friction material such as a polymer-based material (such as nylon), ceramic, or the like.

The cam follower 476 can be a wheel, disc, roller, or the like configured to form a rolling interface between the cam surface 472 and the cam follower 476. The cam follower 476 can be made of a low-friction material such as a polymer-based material (such as polyoxymethylene (POM), for example Delrin or other POMs), ceramic, or the like. The cam follower 476 can have an outer diameter that is relatively larger than the pin 478 to reduce rolling friction. For example, the outer diameter of the cam follower 476 can be between 5 mm and 30 mm. Optionally, the outer diameter of the cam follower 476 can be between 10 mm and 20 mm, such as 13, 14, or 15 mm. The outer diameter of the cam follower 476 can be maximized or optimized based on contact between the cam surface 472 and a portion of the body 402 when the drive wheel 412 is in the fully retracted or stored position.

The spring assembly 462 can include a biasing element 482 and optionally an extension tube 484. The biasing element 482 can be any biasing element such as an extension spring, compression spring, spring bar, torsion spring, or the like. The biasing element 482 can be connected to a pivot 488 to connect the spring assembly 462 to the body 402 such that the spring assembly 462 can pivot with respect to the body 402. The biasing element 482 can also be connected to the cam arm 474 directly or indirectly. For example, the biasing element 482 can connect to the extension tube 484 at a spring connection 486. The extension tube 484 can then be connected to the 474 via a tube post 490 to pivotably connect the extension tube 484 to the cam arm 474 such as to bias the drive wheel arm 412 toward the extended position and to allow rotation of the spring assembly 462 with respect to the cam arm 474.

In operation of some examples, the suspension system 454 can apply a force to move the drive wheel 412 to extend from the body 402 and to maintain a downforce on the drive wheel 412, for example as the drive wheel 412 moves between the retracted position shown in FIG. 4A, to the partially extended position of FIG. 4B, to the fully extended position of FIG. 4C. Use of springs connected to wheel arms (without a cam) can effectively deliver downforce; however, the delivered downforce can decay as the drive wheel extends from the body, delivering a less-than-desirable downforce profile for many operating conditions, such as navigating through high-pile carpet. Components and methods of the designs of the present application can help to address these issues, such as by using the cam follower assembly 460 and cam 458 to vary the mechanical advantage as the drive wheel 412 is extended and retracted to achieve a desired downforce profile. For example, the spring decay that results as the drive wheel 412 moves toward an extended position can be canceled (or compensated for) by increasing mechanical advantage between the cam follower assembly 460 and the cam 458 as the suspension system 454 moves with the drive wheel 412. Further operational details are discussed below.

As shown in FIG. 4A, the drive wheel 412 can be in the retracted position. In the retracted position, the cam follower 476 can be pivoted upward and can be engaged with a rear portion of the cam surface 472 of the cam 458. In such a condition or position, the biasing element 482 can be maximally or near maximally extended as the extension tube 484 is nearly in contact with (or is in contact with) an upper portion of the body 402 of the mobile cleaning robot 400. However, due to the contact position of the cam follower 476 with the cam surface 472 the mechanical advantage between the cam follower assembly 460 and the cam 458 (which deliver the force generated by the biasing element 482) can be relatively low.

As shown in FIG. 4B, the drive wheel 412 can be moved to a partially extended position, such as where the drive wheel 412 engages the floor along with the skids 411, which can be a hard floor surface configuration or condition, for example. In this position, the suspension system 454 can be rotated downward from its position in FIG. 4A, causing the cam follower 476 to roll forward on the cam surface 472, increasing a mechanical advantage between the cam arm 474 and the cam 458, helping to more effectively deliver force from the biasing element 482 to the drive wheel 412. This increase in mechanical advantage can balance out the force decay in the biasing element 482 caused by the reduction in length L1 of the biasing element 482 from FIG. 4A to FIG. 4B.

As shown in FIG. 4C, the drive wheel 412 can be moved to a fully extended position, such as where the drive wheel 412 engages the floor 50 but the skids 411 are elevated from the floor 50, which can be a configuration or condition where the mobile cleaning robot 400 is navigating on high-pile carpeting or traversing an obstacle. In this position of FIG. 4C, the suspension system 454 can be rotated downward further form its position in FIG. 4B, causing the cam follower 476 to roll further forward on the cam surface 472, increasing a mechanical advantage between the cam arm 474 and the cam 458, helping to more effectively deliver force from the biasing element 482 to the drive wheel 412. This increase in mechanical advantage between the positions of FIGS. 4B and 4C can further help to balance the force decay in the biasing element 482 caused by the reduction in length L1 of the biasing element 482 from FIG. 4B to FIG. 4C, which can help maintain a constant or near constant downforce between the positions of FIGS. 4A-4C.

The suspension system 454 can thereby deliver a constant (or non-decaying) downforce over a full range of travel of the drive wheel 412. Though a constant downforce is discussed as being delivered by the suspension system 454, the suspension system 454 can also be tailored or designed to deliver a desired downforce profile by altering, for example, a shape or profile of the cam surface 472 to alter the mechanical advantage. For example, the cam surface 472 can be shaped to deliver a non-linear downforce to the drive wheel 412 as the drive wheel 412 moves between the extended position and the retracted position. In other words, the cam surface 472 can be shaped to deliver a desired force profile over a range of movement of the drive wheel arm 456 between the extended position and the retracted position.

Advantageously, because the cam follower 476 can be separated from the cam 458, the drive wheel arm 456 and drive wheel 412 can be rotated out of the body without disconnecting components of the suspension system 454. This can help to simplify replacement of components of the suspension system 454 or the drive wheel 412, such as a tire tread.

Optionally, as shown in FIG. 4C, the body 402 can include a stop 492 engageable with the cam arm 474 to limit downward movement of the cam arm 474, which can effectively limit application of downward force on the drive wheel arm 456 and therefore to the drive wheel 412. Downward movement or travel of the drive wheel 412 can optionally be limited by engagement between the drive wheel arm 456 and a lower portion of the drive wheel 412.

The extension tube 484 can allow for a biasing element 482 that is longer than the connection between the pivot 488 and the tube post 490 to be used. That is, the biasing element 482 and the extension tube extension tube 484 can extend beyond the connection point (the tube post 490) between the extension tube 484 and the cam arm 474. In other words, the biasing element 482 can have a length L1 that is greater than a distance or length L2 between a connection point (the pivot 488) of the cam arm 474 to the body 402 and the connection point (the tube post 490) between the extension tube 484 and the cam arm 474.

Optionally, as discussed above, the cam 458 can be removable from the drive wheel arm 456 (via the slots 470 and the projections 468, as shown in FIG. 4A). Also, as discussed above, because the suspension system 454 is separated (not rigidly connected), the drive wheel arm 456 and drive wheel 412 can be rotated out from the body 402 easily, such as for maintenance. These features can allow a user, designer, customer, or the like to remove the cam 458 and install a cam with a different cam surface to alter the downforce profile of the suspension system 454, such as to optimize for floor type or to address traversal issues. These features can also allow a user (or the like) to replace a tread of the drive wheel 412 or the drive wheel 412 itself.

Optionally, multiple cams can be connected to the drive wheel arm 456 and the cam arm 474 can be positionable to engage the cam follower 476 with the desired cam.

Figure 5A:
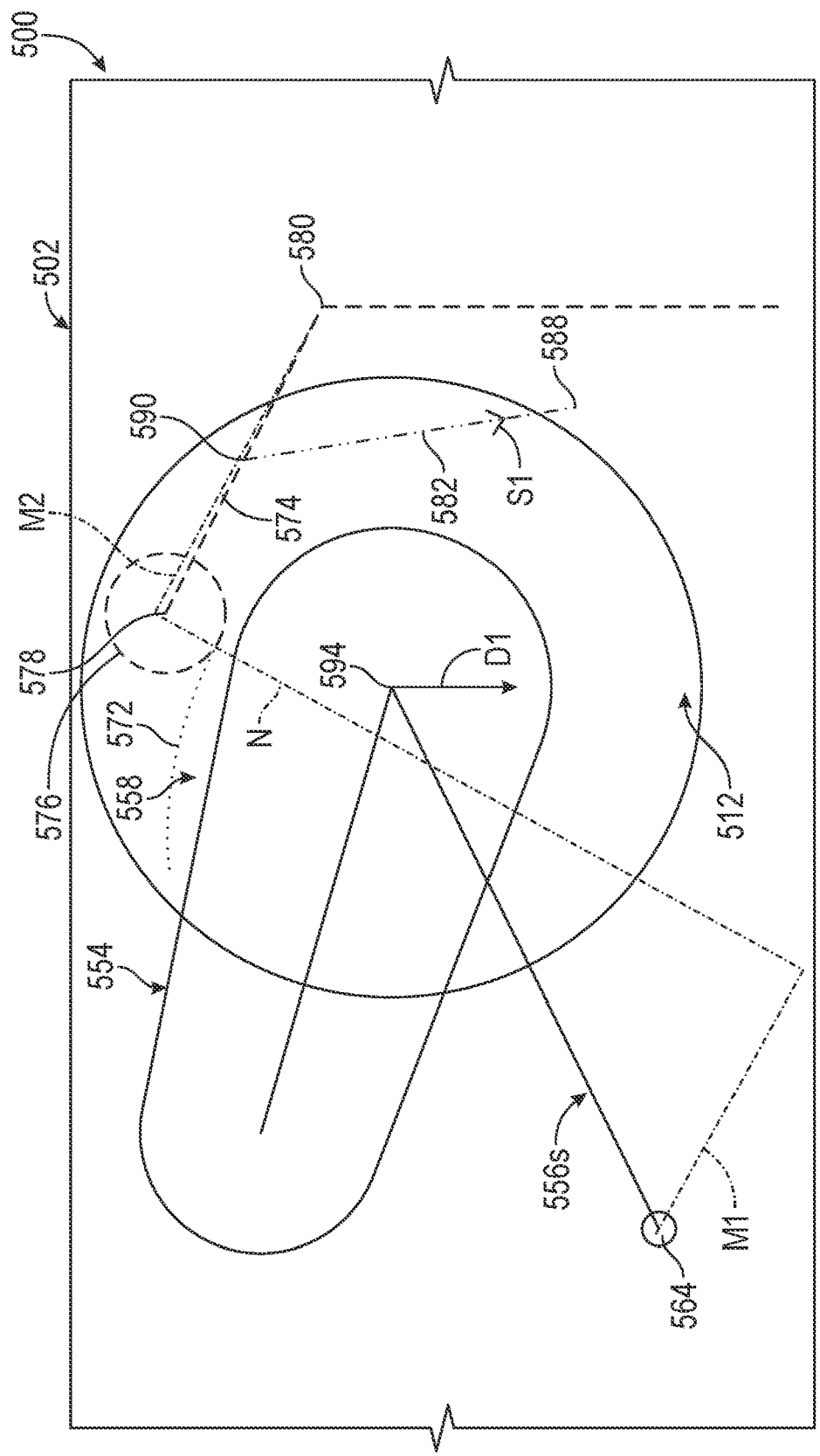
FIG. 5A illustrates a schematic view of a mobile cleaning robot suspension system.
Figure 5B:
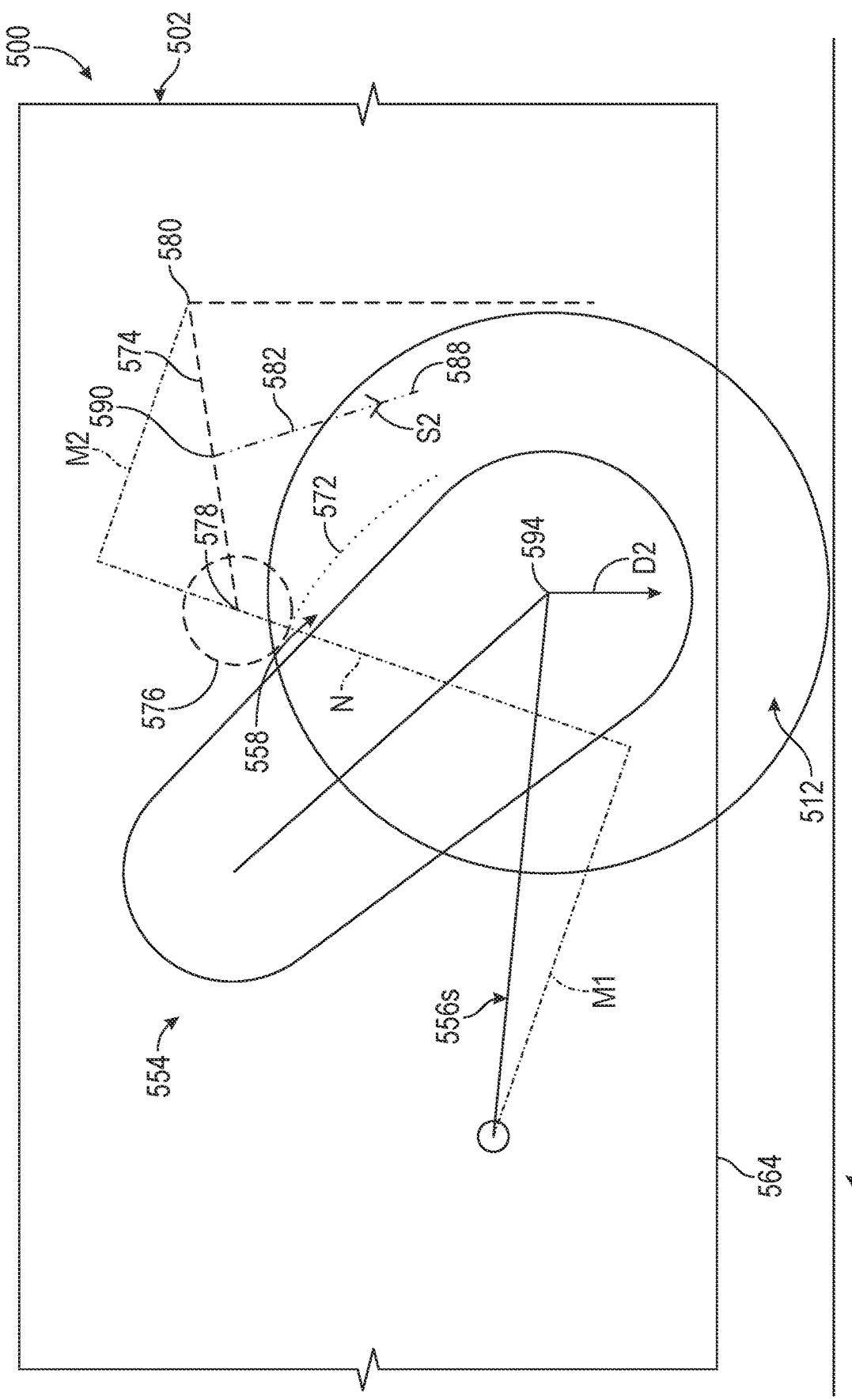
FIG. 5B illustrates a schematic view of a mobile cleaning robot suspension system.

FIGS. 5A and 5B illustrate schematic views of a mobile cleaning robot suspension system 554 of a robot 500 in a stored or retracted position and an extended position. FIGS. 5A and 5B are discussed together below. The suspension system 554 can be similar to the suspension system 454 discussed above, FIGS. 5A and 5B shows the components schematically.

More specifically, FIGS. 5A and 5B show schematic views of connection of a biasing element 582 to a body 502 at a pivot 588. The biasing element 582 can be connected to a cam arm 574 at a tube post 590 (acting as a pivot). The cam arm 574 can be connected to the body 502 at a pivot 580 and the cam arm 574 can be connected to a cam follower 576 via a pin 578. On the other end, a drive wheel arm 556s (a schematic representation of the effective drive wheel arm) can be connected to the body 502 at a pivot 564 and can be connected to a drive wheel 512 at a wheel center 594. The drive wheel arm 556s can be separated from, but engaged with, the cam arm 574 via the cam follower 576. FIGS. 5A and 5B also shows various forces produced by component interaction, where N is a normal force, normal to or tangential to a contact point between a cam surface 572 of a cam 558 and the cam follower 576. M1 can be a moment arm of the biasing element 582 and the cam arm 574 and M2 can be a moment arm of the drive wheel arm 556s.

FIG. 5A shows that when the drive wheel 512 is in the stored position, the biasing element 582 is relatively long such that it produces a large spring force S1 is applied to the cam arm 574. However, because the contact angle between the cam follower 576 and the 572 is relatively horizontal, the moment arm M1 is relatively small (or similarly sized) to the moment arm M2, resulting in a first mechanical advantage and a first wheel downforce D1.

FIG. 5B shows that when the drive wheel 512 is in the extended position, the biasing element 582 is relatively shorter than in the stored position of FIG. 5A, thereby applying a smaller force on the cam arm 574. However, because the contact angle between the cam follower 576 and the cam surface 572 is relatively vertical and because the cam follower 576 has moved forward, the moment arm M1 of FIG. 5B is large relative to the moment arm M2 (and relative to the moment arm M1 of FIG. 5A), resulting in a second mechanical advantage that is larger than the first mechanical advantage. Because the second mechanical advantage is larger than the first mechanical advantage and because the second spring force S2 is smaller than the first spring force S1, the second wheel downforce D2 can be about the same as the first wheel downforce D1, helping to achieve a relatively consistent wheel downforce throughout a range of travel of the drive wheel 512 with respect to the body 502.

Though the downforces D1 and D2 are discussed and shown as being relatively constant (due at least in part to the shape of the cam surface 572), the cam surface 572 can be designed, shaped, or configured to provide a desired downforce at any position over the range of travel of the drive wheel 512. In this way, the robot 500 (and the robots 100 and 500) can include a passive suspension system including a tailored wheel downforce profile.

In some examples, the downforce applied by the suspension system 554 or the robot suspension system 554 can be between 2 and 3.2 pounds (4.9 Newtons (N) to 14.25N). In other examples, the suspension system 554 or the mobile cleaning robot suspension system 554 can provide between 1N and 30N.

Suspension Performance

Figure 7:
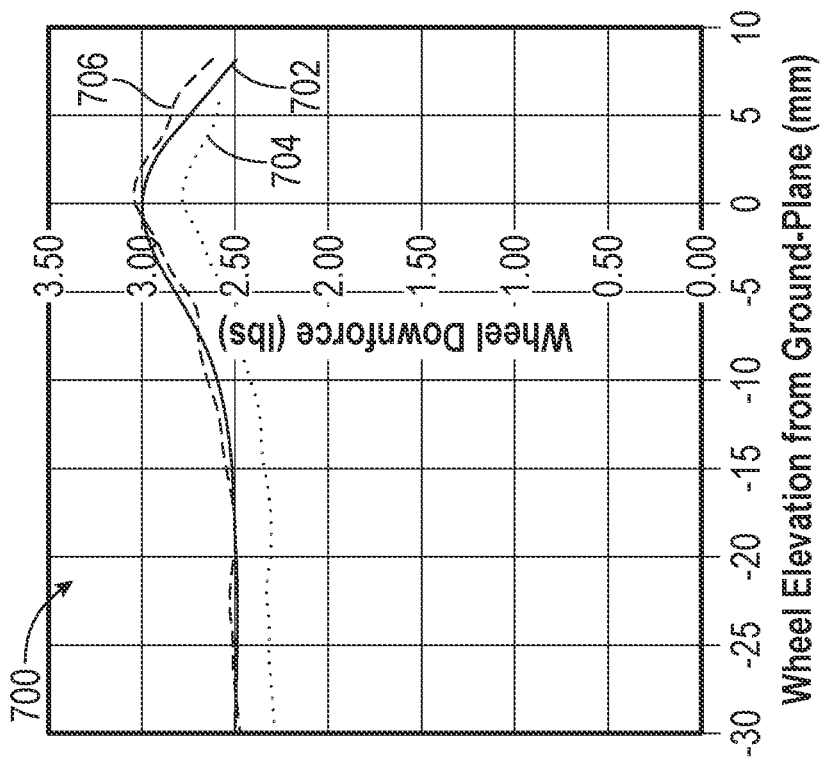
FIG. 7 illustrates a performance chart for a suspension system.
Figure 6:
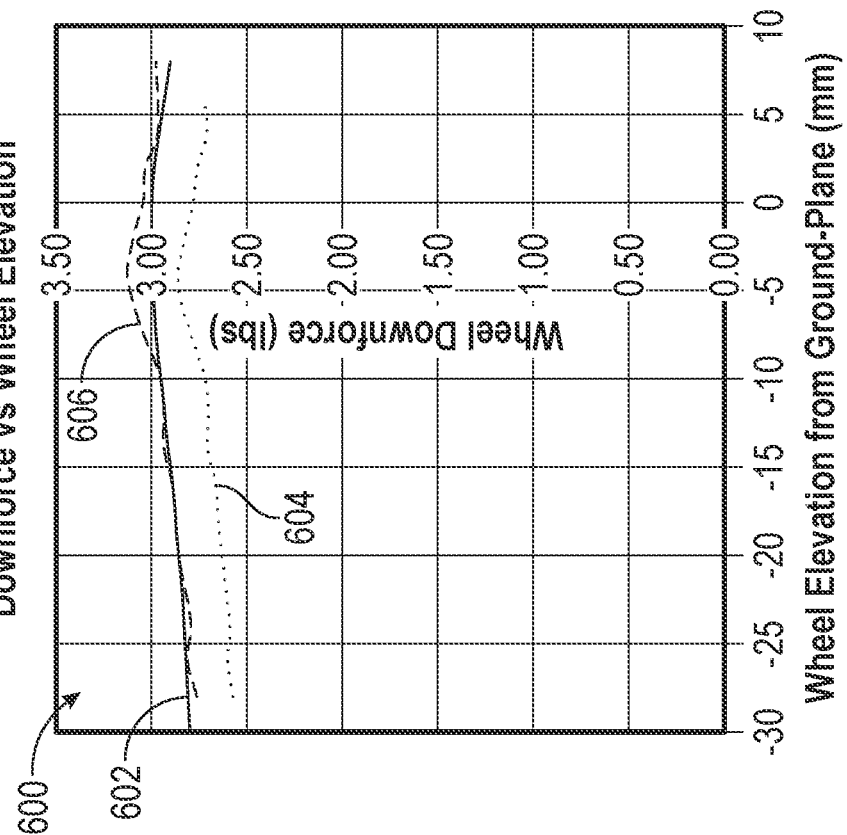
FIG. 6 illustrates a performance chart for a suspension system.

FIG. 6 illustrates a performance chart 600 for a suspension system, such as the mobile cleaning robot 400 or robot 500 where the suspension system has a first cam profile. FIG. 7 illustrates a performance chart 700 for a suspension system, such as the mobile cleaning robot 400 or robot 500 where the suspension system has a second cam profile. FIGS. 6 and 7 are discussed together below.

The performance charts 600 and 700 each show wheel downforce on the Y-axis or vertical axis and shows wheel elevation from ground or wheel travel on the X-axis or horizontal axis. The chart 600 shows a first cam profile calculated (or theoretical) downforce 602, measured downforce 604 provided by the drive wheel (e.g., 412) as the drive wheel extends from the robot, and measured downforce 606 provided by the drive wheel as the drive wheel retracts into the robot. The theoretical plot 602 does not fall about halfway between the two hysteresis plots 604 and 606 likely because the "actual" spring force can be slightly lower than the "theoretical" spring force (and the same spring was used to collect the data for both cam configurations). The chart 700 shows a second cam profile calculated (or theoretical) downforce 702, measured downforce 704 provided by the drive wheel (e.g., 412) as the drive wheel extends from the robot, and measured downforce 706 provided by the drive wheel as the drive wheel retracts into the robot.

The first cam profile (or cam surface shape) of the chart 600 shows a calculated force 602 that has a slight inclining slope as the elevation approaches 0 mm elevation (from −30 mm), peaks around 0 mm wheel elevation, and decreases following retraction into the body (from 0 to 10 mm wheel elevation). This cam profile can provide a relatively consistent wheel downforce (such as 60-75% weight of the robot on the wheels) throughout the range of motion of the drive wheel and wheel arm, where hysteresis causes a differential in extension downforce 604 versus retraction downforce 606.

The second cam profile (or cam surface shape) of the chart 700 shows a calculated force 702 that is relatively flat with a large increase in force around 0 mm of wheel elevation, with measured extension and retraction forces on either side accounting for hysteresis. The second cam profile can be designed to deliver such a force profile to help reduce robot vaulting issues as the robot traverses thresholds or other obstacles. Vaulting is a phenomenon that can occur when a robot traverses an obstacle, such as a threshold or small step, because the step is at a front portion of the drive wheel (closer to the pivot), a large down force can be generated, causing the robot to lift off the ground substantially. This phenomenon can be limited or prevented by altering the cam profile such that downforce is reduced at specific extension distances of the drive wheel.

Though this profile addresses only some issues, it highlights that the cam profile (e.g., the cam surface 472) along with the other components of the suspension (e.g., the biasing element 482, the extension tube 484, and all of the pivot points), can be tunable or designed to provide a passive suspension system with a varied wheel down force profile to address navigation issues or to help optimize navigation or cleaning performance.

Because the cam can be designed in a variety of shapes, the cam system can be tailored to provide a desired wheel downforce for a robot of any weight and desired force profile, such that the cam system can be used in a variety of mobile cleaning robots, helping to communize suspension components and helping to reduce costs between robot model variations.

NOTES AND EXAMPLES

The following, non-limiting examples, detail certain aspects of the present subject matter to solve the challenges and provide the benefits discussed herein, among others.

Example 1 is a mobile cleaning robot movable within an environment, the mobile cleaning robot comprising: a body; a drive wheel arm connected to the body and movable with respect to the body between an extended position and a retracted position; a drive wheel connected to the drive wheel arm and movable therewith, the drive wheel operable to move the mobile cleaning robot; a cam connected to the drive wheel arm and movable therewith; and a cam follower connected to the body, and engaged with the cam to move the drive wheel arm toward the extended position.

In Example 2, the subject matter of Example 1 optionally includes a biasing member connected to the body and the cam follower to bias the drive wheel arm toward the extended position.

In Example 3, the subject matter of Example 2 optionally includes a cam arm connecting the cam follower to the body, the biasing member connected to the cam arm.

In Example 4, the subject matter of Example 3 optionally includes wherein the cam follower is rotatable with respect to the cam arm to rotatably follow the cam.

In Example 5, the subject matter of Example 4 optionally includes an extension tube connected to the biasing member and the cam arm to connect the biasing member to the cam arm.

In Example 6, the subject matter of Example 5 optionally includes wherein the biasing member and the extension tube extend beyond a connection point between the extension tube and the cam arm.

In Example 7, the subject matter of any one or more of Examples 5-6 optionally include wherein the drive wheel arm is pivotably connected to the body, the cam arm is pivotably connected to the body, and the biasing member is pivotably connected to the body.

In Example 8, the subject matter of Example 7 optionally includes wherein the extension tube is pivotably connected to the cam arm.

In Example 9, the subject matter of any one or more of Examples 3-8 optionally include wherein the body includes a stop engageable with the cam arm to limit application of downward force on the drive wheel arm.

In Example 10, the subject matter of any one or more of Examples 1-9 optionally include wherein the cam is shaped to deliver a non-linear downforce from the drive wheel as the drive wheel moves between the extended position and the retracted position.

In Example 11, the subject matter of any one or more of Examples 1-10 optionally include wherein the cam is shaped to deliver a desired force profile over a range of movement of the drive wheel arm between the extended position and the retracted position.

Example 12 is a suspension assembly of a mobile cleaning robot, suspension assembly comprising: a drive wheel operable to move the mobile cleaning robot; a drive wheel arm connected a body of the mobile cleaning robot and supporting the drive wheel, the drive wheel arm movable with respect to the body between an extended position and a retracted position; a cam connected to the drive wheel arm and movable therewith; and a cam follower connected to the body and engaged with the cam to move the drive wheel arm toward the extended position.

In Example 13, the subject matter of Example 12 optionally includes a biasing member connected to the body and the cam follower to bias the drive wheel arm toward the extended position.

In Example 14, the subject matter of Example 13 optionally includes a cam arm connecting the cam follower to the body, the biasing member connected to the cam arm.

In Example 15, the subject matter of Example 14 optionally includes an extension tube connected to the biasing member and the cam arm to connect the biasing member to the cam arm.

In Example 16, the subject matter of Example 15 optionally includes wherein the biasing member has a length that is greater than a distance between a connection point of the biasing member to the body and a connection point of the extension tube to the cam arm.

In Example 17, the subject matter of Example 16 optionally includes wherein the drive wheel arm is pivotably connected to the body, the cam arm is pivotably connected to the body, and the biasing member is pivotably connected to the body.

In Example 18, the subject matter of Example 17 optionally includes wherein the extension tube is pivotably connected to the cam arm.

Example 19 is a mobile cleaning robot movable within an environment, the mobile cleaning robot comprising: a body; a drive wheel operable to move the mobile cleaning robot; a drive wheel arm connected the body and supporting the drive wheel, the drive wheel arm movable with respect to the body between an extended position and a retracted position; and a cam assembly connected to the body and the drive wheel arm to deliver a desired force profile over a range of movement of the drive wheel arm between the extended position and the retracted position.

In Example 20, the subject matter of Example 19 optionally includes a biasing member connected to the body and the cam follower to bias the drive wheel arm toward the extended position.

In Example 21, the subject matter of Example 20 optionally includes a cam arm connecting the cam follower to the body, the biasing member connected to the cam arm.

In Example 22, the subject matter of Example 21 optionally includes wherein the cam follower is rotatable with respect to the cam arm to rotatably follow the cam.

In Example 23, the subject matter of Example 22 optionally includes an extension tube connected to the biasing member and the cam arm to connect the biasing member to the cam arm.

In Example 27, the apparatuses or method of any one or any combination of Examples 1-23 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A mobile cleaning robot movable within an environment, the mobile cleaning robot comprising:
    a body;
    a drive wheel arm connected to the body and movable with respect to the body between an extended position and a retracted position;
    a drive wheel connected to the drive wheel arm and movable therewith, the drive wheel operable to move the mobile cleaning robot;
    a cam connected to the drive wheel arm and movable therewith; and
    a cam follower connected to the body, and engaged with the cam to move the drive wheel arm toward the extended position.

2. The mobile cleaning robot of claim 1, further comprising:
    a biasing member connected to the body and the cam follower to bias the drive wheel arm toward the extended position.

3. The mobile cleaning robot of claim 2, further comprising:
    a cam arm connecting the cam follower to the body, the biasing member connected to the cam arm.

4. The mobile cleaning robot of claim 3, wherein the cam follower is rotatable with respect to the cam arm to rotatably follow the cam.

5. The mobile cleaning robot of claim 4, further comprising:
    an extension tube connected to the biasing member and the cam arm to connect the biasing member to the cam arm.

6. The mobile cleaning robot of claim 5, wherein the biasing member and the extension tube extend beyond a connection point between the extension tube and the cam arm.

7. The mobile cleaning robot of claim 5, wherein the drive wheel arm is pivotably connected to the body, the cam arm is pivotably connected to the body, and the biasing member is pivotably connected to the body.

8. The mobile cleaning robot of claim 7, wherein the extension tube is pivotably connected to the cam arm.

9. The mobile cleaning robot of claim 3, wherein the body includes a stop engageable with the cam arm to limit application of downward force on the drive wheel arm.

10. The mobile cleaning robot of claim 1, wherein the cam is shaped to deliver a non-linear downforce from the drive wheel as the drive wheel moves between the extended position and the retracted position.

11. The mobile cleaning robot of claim 1, wherein the cam is shaped to deliver a desired force profile over a range of movement of the drive wheel arm between the extended position and the retracted position.

12. A suspension assembly of a mobile cleaning robot, suspension assembly comprising:
    a drive wheel operable to move the mobile cleaning robot;
    a drive wheel arm connected to a body of the mobile cleaning robot and supporting the drive wheel, the drive wheel arm movable with respect to the body between an extended position and a retracted position;
    a cam connected to the drive wheel arm and movable therewith; and
    a cam follower connected to the body and engaged with the cam to move the drive wheel arm toward the extended position.

13. The suspension assembly of claim 12, further comprising:
    a biasing member connected to the body and the cam follower to bias the drive wheel arm toward the extended position.

14. The suspension assembly of claim 13, further comprising:
    a cam arm connecting the cam follower to the body, the biasing member connected to the cam arm.

15. The suspension assembly of claim 14, further comprising:
    an extension tube connected to the biasing member and the cam arm to connect the biasing member to the cam arm.

16. The suspension assembly of claim 15, wherein the biasing member has a length that is greater than a distance between a connection point of the biasing member to the body and a connection point of the extension tube to the cam arm.

17. The suspension assembly of claim 16, wherein the drive wheel arm is pivotably connected to the body, the cam arm is pivotably connected to the body, and the biasing member is pivotably connected to the body.

18. The suspension assembly of claim 17, wherein the extension tube is pivotably connected to the cam arm.

19. A mobile cleaning robot movable within an environment, the mobile cleaning robot comprising:
    a body;
    a drive wheel operable to move the mobile cleaning robot;

a drive wheel arm connected to the body and supporting the drive wheel, the drive wheel arm movable with respect to the body between an extended position and a retracted position;

a cam assembly connected to the body and the drive wheel arm to deliver a desired force profile over a range of movement of the drive wheel arm between the extended position and the retracted position; and a biasing member connected to the body and a cam follower to bias the drive wheel arm toward the extended position.

20. The mobile cleaning robot of claim 19, further comprising:

a cam arm connecting the cam follower to the body, the biasing member connected to the cam arm.

21. The mobile cleaning robot of claim 20, wherein the cam follower is rotatable with respect to the cam arm to rotatably follow a cam.

22. The mobile cleaning robot of claim 21, further comprising:

an extension tube connected to the biasing member and the cam arm to connect the biasing member to the cam arm.

\* \* \* \* \*